L. R. DUNN.
MONKEY WRENCH.
APPLICATION FILED MAR. 8, 1918.
1,271,452.
Patented July 2, 1918.
Fig. 1.
Fig. 2.
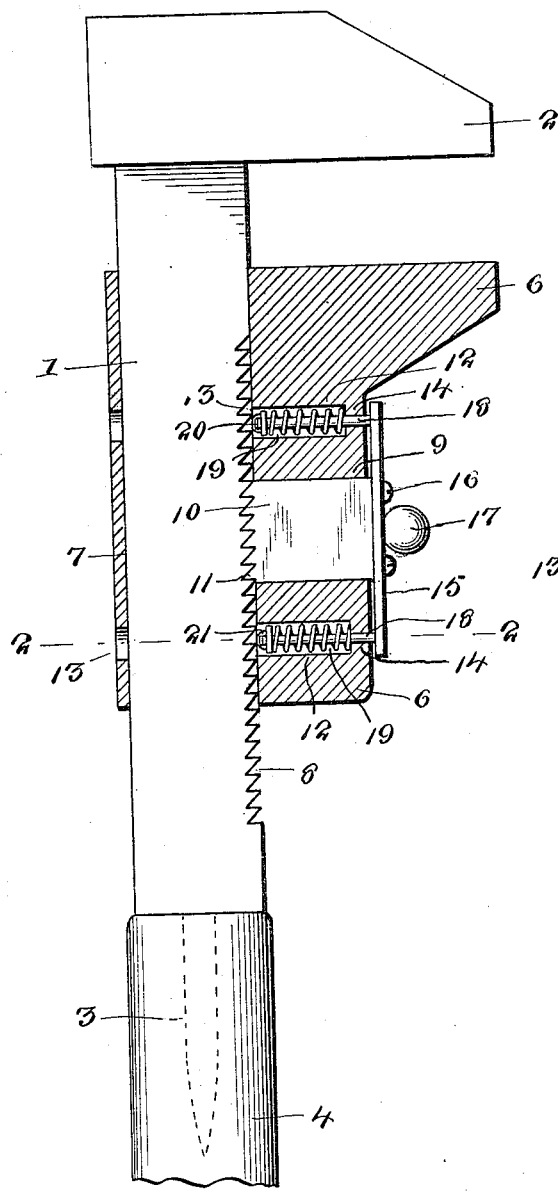
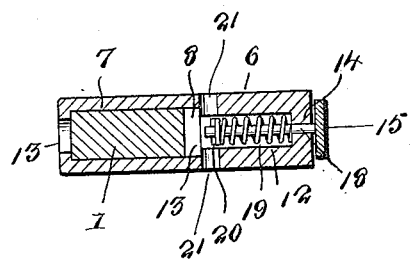
Inventor
L. R. Dunn
By Victor J. Evans
Attorney
Witness
E. R. Ruppert

UNITED STATES PATENT OFFICE.

LEO R. DUNN, OF FARMER, SOUTH DAKOTA.

MONKEY-WRENCH.

1,271,452.  Specification of Letters Patent.  Patented July 2, 1918.

Application filed March 8, 1918. Serial No. 221,258.

*To all whom it may concern:*

Be it known that I, LEO R. DUNN, a citizen of the United States, residing at Farmer, in the county of Hanson and State of South Dakota, have invented new and useful Improvements in Monkey-Wrenches, of which the following is a specification.

This invention is an improved monkey wrench, the object of the invention being to provide an improved monkey wrench which embodies novel and improved means to enable the movable jaw to be rapidly adjusted and to be secured in any desired adjusted position without the necessity of employing an adjusting screw.

With the above and other objects in view, the invention consists in the construction, combination and arrangement of devices, hereinafter described and claimed.

In the drawing:

Figure 1 is an elevation partly in section of a monkey wrench constructed and arranged in accordance with my invention.

Fig. 2 is a transverse sectional view of the same on the plane indicated by the line 2—2 of Fig. 1.

The shank 1 of my improved wrench is provided, at one end, with the fixed jaw 2 and is provided at the opposite end with a threaded stem 3 to which a handle 4 is screwed.

The movable jaw 5 is formed with a block 6 which block has a longitudinal opening 7 through which the shank 1 extends and so that the block together with the movable jaw is adapted to slide on the shank toward and from the fixed jaw. The shank is provided on the same side with the fixed jaw with a series of ratchet teeth 8. The block 6 has an opening 9 in which a dog 10 is fitted, the dog being movable to and from the shank and being provided with teeth 11 which may be engaged with the ratchet teeth 8 and thereby cause the dog to lock the movable jaw in any desired adjusted position. The block 6 is also provided with bores 12 which are open at one side of the block as at 13 and are closed at the opposite side of the block as at 14. A bar 15 is secured to the outer side of the dog by means of screws 16 and is provided at a point midway between its ends with a knob 17. The bar is also provided with a pair of arms 18 which extend into the bores 12, through small central openings at the closed end of said bores and on the said arms are coiled extensile springs 19 which bear against the inner ends of the bores and also bear against cotter pins 20, which cotter pins are arranged in openings near the outer ends of the arms.

The springs, together with the arms 18 and the bar 15 normally hold the dog in engaged relation to the ratchet teeth of the shank, and hence, the movable jaw is normally securely held in any position in which it may be arranged with respect to the fixed jaw. To enable the movable jaw to be adjusted it is only necessary to draw the dog 10 outwardly by means of the knob 17 and against the tension of the springs and thus cause the dog to disengage the teeth of the shank. When the movable jaw has been moved to the desired position, the knob is released and the springs immediately cause the dog to reëngage the ratchet teeth of the shank, so that the movable jaw is securely locked in such position. The open ends 13 of the bores permit the assembling of the springs and openings 21 in one side of the block and which extend through the bores permit the insertion and removal of the cotter pins, as will be understood.

I claim:—

In a wrench of the class described, in combination with a shank having ratchet teeth on one side and a fixed jaw at one end, a movable jaw having a block provided with a longitudinal opening through which the shank extends, so that said block and movable jaw are mounted for sliding movement on the shank, said block being also provided with an opening extending to one side thereof and a pair of bores spaced from said opening and each open at one end and closed at the opposite end, a dog fitted in said opening of the block and having teeth at its inner end to engage or disengage the ratchet teeth of the shank and arranged with its outer end at the outer side of said block, a bar arranged exteriorly of the block, secured to the outer end of the dog and provided with arms which extend into the bores, and springs on said arms and in said bores, and each attached at one end to one of the arms, the opposite ends of the springs bearing against the closed ends of the bores and said springs exerting their tension to normally hold the dog engaged with the ratchet teeth of the shank.

In testimony whereof I affix my signature.

LEO R. DUNN.

Copies of this patent may be obtained for five cents each, by addressing the "Commissioner of Patents, Washington, D. C."